Feb. 19, 1957  T. T. SWAIN  2,782,046
ARTICLE SUPPORTING DOLLY COMPRISING
TWO INTERCONNECTED TRUCK MEMBERS
Filed Dec. 24, 1953  2 Sheets-Sheet 1
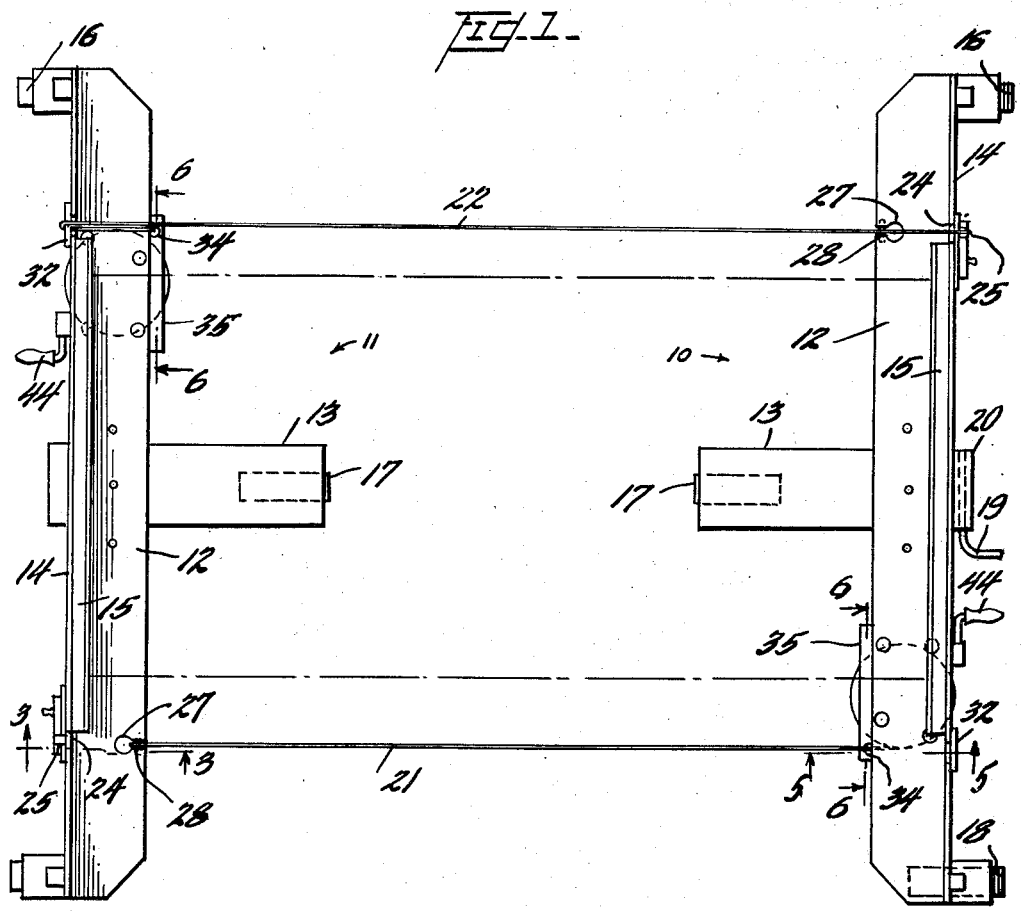
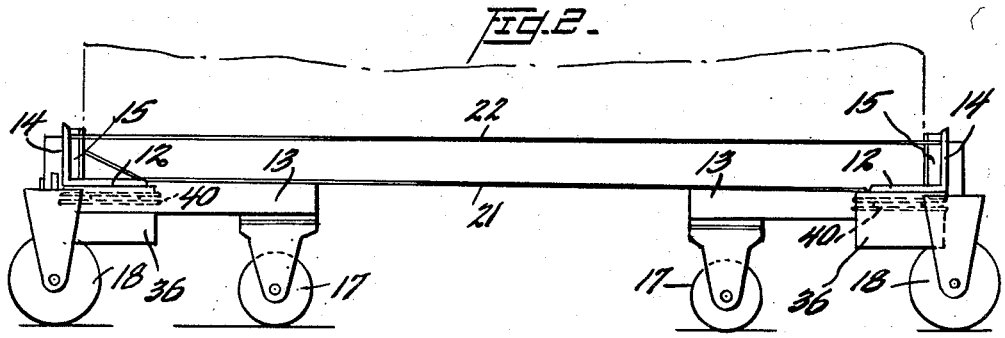
INVENTOR
T. T. Swain,
BY A. C. Schwarz, Jr.
ATTORNEY

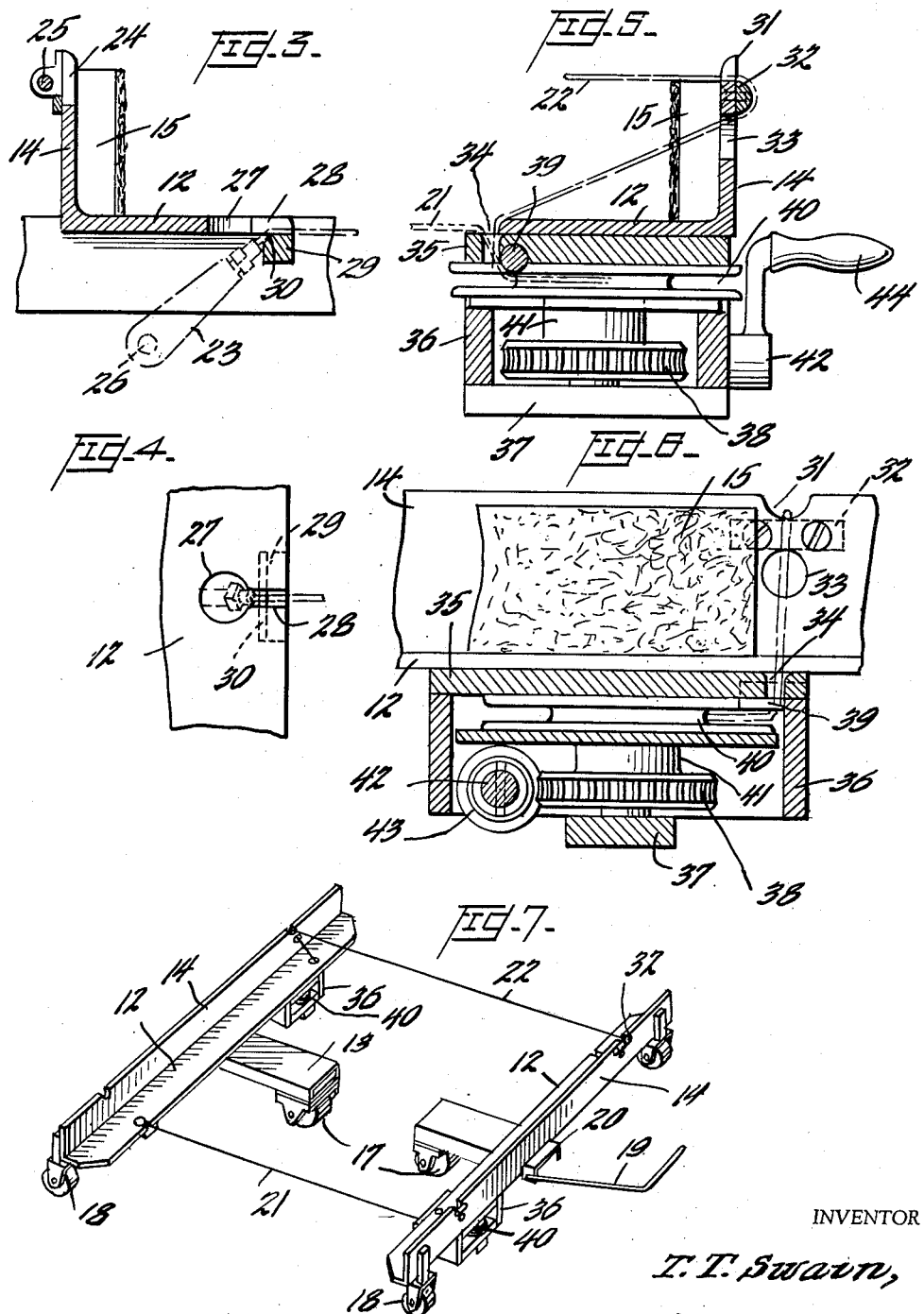

United States Patent Office 2,782,046
Patented Feb. 19, 1957

2,782,046

ARTICLE SUPPORTING DOLLY COMPRISING TWO INTERCONNECTED TRUCK MEMBERS

Thomas T. Swain, Burlington, N. C., assignor to Western Electric Company, Incorporated, a corporation of New York Application December 24, 1953, Serial No. 400,241

5 Claims. (Cl. 280—35)

This invention relates to improvements in dollies of the type used in warehouses, stores, assembly lines, and factories and has reference more particularly to dollies used for transporting articles of various sizes and weights from one location to another while in the process of construction, or for transporting articles generally.

Such articles as boxes, cabinets, appliances, machinery, furniture, etc., may be mounted and transported by means of the hereinafter described dolly, it being understood, however, that the application is not limited in any way to the handling of any one specific article.

Previous work-carrying devices have proven unsatisfactory for transporting articles of various sizes due to the time required to prepare them for loading the article to be moved and also to the instability of the individual truck members.

A universal dolly eliminates the necessity of having numerous dollies that are usable on specific articles only. This lessens the number of dollies required and minimizes the handling and storage of empty dollies, since any size article at hand may be mounted on the first empty dolly returning to its initial starting point in an assembly line.

Accordingly, one object of the present invention is to provide a universal dolly.

It is a further object of this invention to produce a dolly capable of transporting an article of one size and then be quickly and easily adapted to transport an article of a different size.

Another object is to provide a dolly which will secure the article to be moved without rendering it inaccessible to be opened or worked on during the moving operation.

The general principle involved in the present universal dolly is that each truck member has a length of cable contained on a worm-driven drum which enables any two truck members to be drawn toward each other, squeezing an article between them. The friction between the sides of the article and the cushion of each truck member holds the article in place. When storing the dollies, the truck members may be easily stacked in a smaller space than solid dollies would occupy.

The invention further resides in certain novel features of construction and arrangement of parts, and further objects and advantages thereof will be apparent to those skilled in the art to which it pertains from the following description of the present preferred embodiment thereof described with respect to the accompanying drawings in which similar reference characters represent corresponding parts in the several views and in which:

Fig. 1 is a top plan view of the dolly showing the two trucks in operative relation;

Fig. 2 is a side elevation of Fig. 1;

Fig. 3 is a sectional view through line 3—3 on each of the trucks of the dolly in Fig. 1;

Fig. 4 is a partial plan view of Fig. 3;

Fig. 5 is a a sectional view through line 5—5 on each of the trucks of the dolly in Fig. 1;

Fig. 6 is an end view of Fig. 5 as indicated by the line 6—6 in Fig. 1; and

Fig. 7 is an isometric view of Fig. 1.

The dolly which forms the subject of this invention is formed of two members or truck elements which have cooperating means to accomplish the function for which the invention is intended. The two truck elements will now be described.

Since the truck element 10 in Fig. 1 is identical to the truck element 11, the following detailed description of the structure and mechanism of the truck 10 applies equally to truck 11. Referring now more particularly to truck 10 in Fig. 1, the truck element comprises a T-shaped frame of horizontal members 12 and 13. Attached to the horizontal member 12 is a vertical member 14. It is understood that members 12 and 14 may represent the sides of a single integral angular member. Fastened to the vertical member 14 is a resilient member 15 such as wood, rubber, plastic, leather, etc., of somewhat shorter length to act as a bumper or cushion against which the article to be transported is pressed. The T-shaped frame is supported at each of its three extremities by a swivel caster as at 16, 17, and 18 to render the dolly freely movable in all directions. A handle 19 may be inserted into a suitable fixture 20 to move the dolly for the transportation of an article.

In order that the two trucks 10 and 11 may cooperate, two flexible cables 21 and 22 urge the two trucks toward each other thereby pressing tightly between them the article to be transported. Either cable may be adjusted to transverse the span between the two trucks in a raised position, as cable 22, or in a lower position, as cable 21, shown in Fig. 2. Should it be desired to perform some work on the article, while it is loaded on the dolly, whereby any obstruction such as these cables across the span would be undesirable, either or both of the cables may be secured in a lower manner such as cable 21. If, on the other hand, it is desired to further secure the article to be transported on the dolly, then either or both cables may be placed in a raised position, as cable 22.

Fig. 3 represents a cross section taken along the line 3—3 in Fig. 1. Referring now to Fig. 3, should it be desired to place the cable in a raised position, then a cable end connected 23 is inserted through the opening 24 in the vertical side on the flange 14 and anchored in place by a bolt 25 which slides through a hole 26 in the connector 23.

A method for anchoring the cable end connector, should it be desired to locate the cable in the lower position, is illustrated in Figs. 3 and 4. An aperture 27 with a cooperating slot 28 extending therefrom is located in the horizontal member 12. A metal block 29 with a chamfer 30 is secured by any suitable means directly to the underside of the horizontal member 12 beneath the slot 28. The aperture 27 is of sufficient diameter so that the connector 23 may slide easily therethrough. By applying tension the cable slides forward to rest against the chamfer 30 on the block 29 and the slot 28 being sufficiently narrow prevents the connector 23 from pulling through.

Fig. 5 is a cross section of the opposite truck from that shown in Fig. 3 but in the same plane as the cross section in Fig. 3. The position of Figs. 5 and 6 is indicated in Fig. 1. Referring now to Figs. 5 and 6, whether the cable is to be located in its raised or its lower position will determine whether the cable will be shown as at 22 or as at 21. Assuming first the raised position as illustrated by the cable 22, the cable end connector 23 will be anchored by the bolt 25 as previously explained, the cable will traverse the span between the two trucks 10 and 11, as shown in Fig. 1, and will pass through a slot 31 in the vertical member 14. Secured to the vertical member 14 immediately below the slot 31 is a semicircular member 32 of cold rolled steel or other suitable bearin material. This bearing 32 may be fastened to the vertical member 14 by machine screws as shown in Figs. 5 and 6, by welding, or by any other suitable means. After the cable passes through the slot 31, it passes downward and around the bearing 32, and then through an aperture 33 located in the vertical member 14 immediately below the bearing 32. The cable then continues at an angle and passes through an opening 34 located in a base plate 35 immediately below and secured to the horizontal member 12. Located at the under edge of the opening 34 and inset in the base plate 35 is another bearing member 39 which guides the cable around so that it may be wound directly on a drum 40.

In the event it is desired to locate the cable in its lower position as at 21, then the cable end connector is anchored in the slot 28, Fig. 3, as explained before. The cable traverses the span between the two trucks of the dolly, enters directly into the opening 34, bends around the bearing 39, and is wound on the drum 40.

The cable winding mechanism, Fig. 5 and Fig. 6, consists of the drum 40 onto which the cable is wound and a system of gears so constructed as to rotate said drum to apply tension to the cable and urge the two trucks, 10 and 11, toward each other. A housing 36 contains a shaft 41 which extends from the bottom 37 of the housing to the mounting plate 35. Fixedly located on this shaft 41 is the drum 40 and a worm wheel 38. Cooperating with the worm wheel 38 and fixedly mounted on a shaft 42 is a worm gear 43. The shaft 42 is rotated manually by means of a handle 44 which is secured to end of the shaft 42. The mechanical advantage obtained from such gearing arrangement is such that the shaft 42 will not rotate unless rotation is given manually to the handle 44. Therefore, any tension on the cable wrapped on the drum 40 will be unable to rotate the shaft 41 to cause any slackening of the cable. To slacken the cable the handle 44 must be turned by hand.

In Fig. 7 the two trucks of the dolly are shown in operative relationship with cable 21 in the lower position and cable 22 in the raised position.

It will be understood that the embodiment herein described is merely illustrative of the invention and one application thereof, and that modifications can be made and it is capable of other applications all within the scope and spirit of the invention.

What is claimed is:

1. A dolly comprising two T-shaped truck members to jointly receive and carry an article to be transported, caster wheels supporting each of said T-shaped truck members, a drum secured to each of said truck members, cable means wound on said drum on each of said truck members, means on each of said truck members for securing the cable means to opposite truck members, and gear means to actuate said drums to apply tension to said cable means.

2. In a dolly, two truck members each comprising a T-shaped base, a vertical member attached to one end of said base, two flexible cables, means for securing the extremity of said first flexible cable to either said vertical member to traverse the span between said truck members in a raised position or to said horizontal member to traverse said span in a lower position, a drum on each truck member, and a worm gear and wheel arrangement beneath one end of said horizontal member to control said drum to in turn control the tension of said second flexible cable in spaced relation to said first flexible cable.

3. In a dolly, two truck members each comprising a first horizontal member of a base, a second horizontal member of said base located in T-shaped relationship to said first horizontal member, casters supporting said T-shaped base at each of its extremities, a vertical member extending from one of said horizontal members, a cushion on said vertical member against which the article to be carried is pressed, a handle to be attached to either truck for movement of the dolly in the transportation of an article, two flexible cables each connected at one extremity to one of said truck members and at the opposite extremity to the other of said truck members in spaced relation to urge said truck members toward each other, and gear means to tighten or loosen said flexible cables.

4. In a dolly, a pair of truck members each comprising a T-shaped base consisting of a pair of horizontal members, said truck members each having a vertical flange secured to one of said horizontal members, each of said flanges having an aperture near one extremity thereof, a drum secured to each of said truck members beneath the said one of said horizontal members to which said flange is secured near the extremity thereof opposite from the apertured extremity of said flange, a cable wound around said drum, said cable extending from said drum of one of said truck members and through the aperture in said flange in the other of said truck members, means to secure said cable passing through the aperture to said flange member, and means to rotate said drum and thereby tension said cable.

5. In a dolly, a pair of truck members for jointly receiving and supporting an article to be transported each comprising a T-shaped base, a vertical flange secured to said base, a drum secured rotatably to said base, a cable wound around said drum, said cable extending from said drum of one of said truck members to the other of said truck members, means to secure said cable to said other of said truck members, means to rotate said drum to apply and maintain tension in said cable, whereby an article supported on said truck members will be engaged between said vertical flange on each of said truck members, and sufficient wheeled means secured to said base to cause said base to be self-balancing, whereby the dolly and article thereon may be transported.

References Cited in the file of this patent

UNITED STATES PATENTS

| 881,708 | Noyes | Mar. 10, 1908 |
| 1,392,387 | Wood | Oct. 4, 1921 |
| 2,219,609 | Askaris | Oct. 29, 1940 |
| 2,349,251 | Domoj | May 23, 1944 |

FOREIGN PATENTS

| 294,687 | Italy | Apr. 1, 1932 |